US007801289B2

(12) United States Patent  
Adamczyk et al.

(10) Patent No.: US 7,801,289 B2
(45) Date of Patent: Sep. 21, 2010

(54) VOICE-OVER NETWORK (VON)/VOICE-OVER INTERNET PROTOCOL (VOIP) ARCHITECT USING ADVANCE INTELLIGENT NETWORK ALTERNATIVES

(75) Inventors: Maria Adamczyk, Alpharetta, GA (US); Sharolyn S. Farmer, Stone Mountain, GA (US); Henry J. Kafka, Atlanta, GA (US); Anita Hogans Simpson, Decatur, GA (US); John Paul Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1097 days.

(21) Appl. No.: 11/133,670

(22) Filed: May 20, 2005

(65) Prior Publication Data

US 2005/0232243 A1 Oct. 20, 2005

Related U.S. Application Data

(63) Continuation-in-part of application No. 10/024,135, filed on Dec. 21, 2001, now Pat. No. 7,391,761.

(60) Provisional application No. 60/615,922, filed on Oct. 5, 2004, provisional application No. 60/569,504, filed on May 7, 2004.

(51) Int. Cl.
*H04M 3/42* (2006.01)
*H04Q 11/00* (2006.01)
*G06F 15/16* (2006.01)

(52) U.S. Cl. .................... 379/201.01; 379/216.01; 379/207.02; 379/207.11; 370/260; 709/229

(58) Field of Classification Search ......... 370/260–267, 370/432, 458, 460, 351–357; 379/202.01, 379/204.01, 211.02, 216.01; 709/229
See application file for complete search history.

(56) References Cited

U.S. PATENT DOCUMENTS

| 4,935,951 | A | 6/1990 | Robinson et al. |
| 4,993,058 | A | 2/1991 | McMinn et al. |
| 5,012,507 | A | 4/1991 | Leighton et al. |
| 5,161,180 | A | 11/1992 | Chavous |
| RE34,677 | E | 7/1994 | Ray et al. |
| 5,511,111 | A | 4/1996 | Serbetcioglu et al. |
| 5,526,406 | A | 6/1996 | Luneau |
| 5,621,379 | A | 4/1997 | Collins |
| 5,673,304 | A | 9/1997 | Connor et al. |
| 5,724,412 | A | 3/1998 | Srinivasan |

(Continued)

OTHER PUBLICATIONS

U.S. Appl. No. 11/318,110, filed Dec. 2005.

(Continued)

*Primary Examiner*—Curtis Kuntz
*Assistant Examiner*—Mohammad K Islam
(74) *Attorney, Agent, or Firm*—Myers Bigel Sibley & Sajovec

(57) ABSTRACT

Voice service over a next generation network is provided using Advanced Intelligent Network solutions. A voice over network communications signal is communicated from an analog communications device over a telecommunications network to a softswitch (SSW) complex that detects and decodes a directory communications address to identify an internal, secret line number (SLN) communications address and, if associated with an SLN, to activate a voice over network application trigger to enable voice communications over an Internet Protocol, data communications network.

19 Claims, 6 Drawing Sheets

U.S. PATENT DOCUMENTS

| | | | |
|---|---|---|---|
| 5,796,806 A | 8/1998 | Birckbichler | |
| 5,805,587 A | 9/1998 | Norris et al. | |
| 5,883,942 A | 3/1999 | Lim et al. | |
| 5,940,474 A | 8/1999 | Ruus | |
| 5,940,475 A | 8/1999 | Hansen | |
| 6,009,148 A | 12/1999 | Reeves | |
| 6,011,473 A | 1/2000 | Klein | |
| 6,104,800 A | 8/2000 | Benson | |
| 6,144,644 A | 11/2000 | Bajzath et al. | |
| 6,208,718 B1 | 3/2001 | Rosenthal | |
| 6,208,726 B1 | 3/2001 | Bansal et al. | |
| 6,215,784 B1* | 4/2001 | Petras et al. | 370/356 |
| 6,219,413 B1 | 4/2001 | Burg | |
| 6,259,692 B1 | 7/2001 | Shtivelman | |
| 6,307,920 B1 | 10/2001 | Thomson et al. | |
| 6,310,946 B1 | 10/2001 | Bauer et al. | |
| 6,330,244 B1* | 12/2001 | Swartz et al. | 370/401 |
| 6,343,115 B1 | 1/2002 | Foldare et al. | |
| 6,347,136 B1 | 2/2002 | Horan | |
| 6,356,756 B1 | 3/2002 | Koster | |
| 6,363,065 B1 | 3/2002 | Thornton et al. | |
| 6,434,126 B1 | 8/2002 | Park | |
| 6,442,609 B1* | 8/2002 | Lambert et al. | 709/227 |
| 6,476,763 B2 | 11/2002 | Allen, Jr. | |
| 6,480,581 B1 | 11/2002 | Wa et al. | |
| 6,529,500 B1 | 3/2003 | Pandharipande | |
| 6,603,977 B1 | 8/2003 | Walsh et al. | |
| 6,608,886 B1 | 8/2003 | Contractor | |
| 6,614,781 B1 | 9/2003 | Elliott et al. | |
| 6,622,016 B1 | 9/2003 | Sladek et al. | |
| 6,624,754 B1 | 9/2003 | Hoffman et al. | |
| 6,661,785 B1* | 12/2003 | Zhang et al. | 370/352 |
| 6,665,293 B2 | 12/2003 | Thornton et al. | |
| 6,665,388 B2 | 12/2003 | Bedingfield | |
| 6,665,611 B1 | 12/2003 | Oran et al. | |
| 6,674,745 B1 | 1/2004 | Schuster et al. | |
| 6,678,357 B2 | 1/2004 | Stumer et al. | |
| 6,680,998 B1 | 1/2004 | Bell et al. | |
| 6,703,930 B2 | 3/2004 | Skinner | |
| 6,704,305 B2 | 3/2004 | Emerson, III | |
| 6,718,021 B2 | 4/2004 | Crockett et al. | |
| 6,763,020 B1 | 7/2004 | Hon | |
| 6,771,742 B2 | 8/2004 | McCalmont et al. | |
| 6,792,081 B1 | 9/2004 | Contractor | |
| 6,798,772 B2* | 9/2004 | Bergman et al. | 370/354 |
| 6,804,338 B1 | 10/2004 | Chen | |
| 6,842,448 B1 | 1/2005 | Norris et al. | |
| 6,868,074 B1 | 3/2005 | Hanson | |
| 6,885,660 B2* | 4/2005 | Inbar et al. | 370/352 |
| 6,912,399 B2 | 6/2005 | Zirul et al. | |
| 6,940,950 B2 | 9/2005 | Dickinson et al. | |
| 6,954,454 B1* | 10/2005 | Schuster et al. | 370/352 |
| 7,016,338 B2* | 3/2006 | Gunn et al. | 370/352 |
| 7,035,250 B2* | 4/2006 | Lai et al. | 370/352 |
| 7,092,380 B1 | 8/2006 | Chen et al. | |
| 7,257,387 B2 | 8/2007 | Laliberte | |
| 7,277,421 B1* | 10/2007 | Pershan | 370/352 |
| 7,376,129 B2* | 5/2008 | Acharya et al. | 370/352 |
| 7,489,769 B2* | 2/2009 | Knoerle et al. | 379/101.01 |
| 2001/0005372 A1 | 6/2001 | Cave et al. | |
| 2001/0043684 A1 | 11/2001 | Guedalia et al. | |
| 2002/0059374 A1 | 5/2002 | Nuestro | |
| 2002/0072348 A1 | 6/2002 | Wheeler et al. | |
| 2002/0101860 A1 | 8/2002 | Thornton et al. | |
| 2002/0160745 A1 | 10/2002 | Wang | |
| 2002/0188744 A1* | 12/2002 | Mani | 709/231 |
| 2003/0211839 A1 | 11/2003 | Baum et al. | |
| 2003/0216148 A1 | 11/2003 | Henderson | |
| 2004/0037403 A1 | 2/2004 | Koch | |
| 2004/0057425 A1 | 3/2004 | Brouwer et al. | |
| 2004/0101123 A1 | 5/2004 | Garcia | |
| 2004/0140928 A1 | 7/2004 | Cleghorn | |
| 2004/0264439 A1* | 12/2004 | Doherty et al. | 370/352 |
| 2005/0047574 A1 | 3/2005 | Reid | |
| 2005/0063519 A1 | 3/2005 | James | |
| 2005/0074111 A1* | 4/2005 | Hanson et al. | 379/212.01 |
| 2005/0151642 A1 | 7/2005 | Tupler et al. | |
| 2005/0175166 A1 | 8/2005 | Welenson et al. | |
| 2005/0190750 A1 | 9/2005 | Kafka et al. | |
| 2005/0190892 A1 | 9/2005 | Dawson et al. | |
| 2005/0232243 A1 | 10/2005 | Adamczyk et al. | |
| 2005/0249195 A1* | 11/2005 | Simpson | 370/352 |
| 2005/0250468 A1 | 11/2005 | Lu | |

OTHER PUBLICATIONS

U.S. Appl. No. 10/024,135, filed Dec. 2001.
"VoIP Patent Applied For", Techweb News, Author and Date Unknown, p. 1.
"Bells Ringing in Net Phone 911", CNET News.com by Ben Charny, staff writer, *Daily Clips*, Mar. 7, 2005, pp. 1-2.
"VoIP Emergency Calling Services," Intrado Informed Responses, 2003, Author Not Available, Intrado Inc., Longmont, Colorado, USA, pp. 1-2.
"BellSouth E911 Service Interfaces to Customer Premises Equipment at a Public Safety Answering Point", Technical Reference, Issue 6, TR73528, Apr. 2001.
"The Development of 9-1-1", http://www.sorc911.com/9-1-1-%20History.htm, May 21, 2004.
U.S. Appl. No. 11/089,296.
"VoIP Patent Applied For," Techweb News, Author and Date Unknown, p. 1.
"Bells Ringing in Net Phone 911," CNET News.com by Ben Charny, staff writer, *Daily Clips*, Mar. 7, 2005, pp. 1-2.
"VoIP Emergency Calling Services," Intrado Informed Responses, 2003, Author Not Available, Intrado Inc., Longmont, Colorado, USA pp. 1-2.
"BellSouthE911 Service Interfaces to Customer Premises Equipment at a Public Safety Answer Point," Technical Reference, Issue 6, TR73528, Apr. 2001.
"The Development of 9-1-1," http://www.sorc911.com/9-1-1-%20History.htm, May 21, 2004.
"FCC Addresses VoIP 911 Calls," BellSouth NewsSource from Staff and News Services, by Russell Grantham, May 8, 2005, p. 1.
"AG Files Suit Against Vonage Over 911," BellSouth NewsSource, by Ted Gotsch, May 5, 2005, pp. 1-2.
"FCC Boss Pushes 911 Plan," BellSouth NewsSource from Staff and News Services, by Renee Degross, Apr. 28, 2005, pp. 1-2.
"Helpless in a 911 Emergency: Some Internet Phone Services Leave Consumers Without a Lifeline," Newsday, Richard J. Dalton, Jr., May 11, 2005, pp. 1-3.
"Tests Show Many Cellphone Calls to 911 Go Unlocated," The Wall STreet Journal, by Anne Marie Squeo, May 19, 2005, pp. 1-3.
FCC to Rule on 911 Access for Web Phones, Washington Post, by Yuki Noguchi, Washington Post Staff Writer, May 18, 2005, pp. 1-3.
BellSouth Clarifies View on VoIP '911' Availability, TR Daily, by Lynn Stanton, May 17, 2005, p. 1.
"Level 3 Communications Sees 911 as its Edge in Internet Telephony," by Heather Draper, Dow Jones Newswires, Jun. 29, 2005, pp. 1-2.
US 5,905,788, 05/1999, Bauer et al. (withdrawn)

* cited by examiner

VOICE-OVER NETWORK (VON)/VOICE-OVER INTERNET PROTOCOL (VOIP) ARCHITECT USING ADVANCE INTELLIGENT NETWORK ALTERNATIVES

This application is a continuation-in-part of commonly assigned U.S. pat. application Ser. No. 10/024,135 entitled "System and Method for Voice over Internet Protocol Using a Standard Telephone System," filed on Dec. 21, 2001, now U.S. Pat. No. 7,391,761 and of which is incorporated herein by this reference.

This application also claims the benefit of applicants' co-pending U.S. Provisional Application No. 60/569,504 filed on May 7, 2004 of which is incorporated herein by reference.

This application further claims the benefit of applicants' co-pending U.S. Provisional Application No. 60/615,922 filed on Oct. 5, 2004 of which is incorporated herein by reference.

Additionally, this application relates to a commonly assigned co-pending U.S. patent application Ser. No. 11/119,109 entitled "Voice-over-Network (VoN)/Voice Over Internet Protocol (VoIP) Architect Having Hotline and Optional Tie Line," filed on Apr. 29, 2005, and of which is incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments relate to Voice-Over Internet Protocol, and more specifically, to methods and systems for delivery of voice service over a data communications network and/or a telecommunications network.

Internet telephony, also referred to herein as Voice-Over Internet Protocol (VoIP), Voice-Over Network (VoN), Internet Protocol Telephony (IP Telephony), and others, is experiencing explosive growth and marked improvements in reliability and sound quality. The improved Internet telephony communications are, in large part, due to upgrading the internet backbone with better switching fabrics, such as Asynchronous Transfer Mode (ATM), and also due to implementation of new communications standards, such as standards for transport protocols, directory services, and/or audio codec format.

Along with these improvements come new challenges for the industry. For example, to support a voice communications path within a customer's premise (e.g., a customer's home or business) through a telephony communications path (e.g., DSL) with a data communications network, some combination(s) of integrated access devices (IAD), analog terminal adaptors (ATA), and/or telephone adapters (TA) must be installed at the customer's premise. For example, the customer may connect an existing analog phone (e.g., Plain Old Telephone Service (POTS) phone), including a cordless telephone, to the ATA or TA to originate and receive calls over a VoN line. A VoN dial-tone is provided to all telephone extensions connected with a TA. This VoN communications connection may include various hardware and equipment, such as, for example, soft switches (SSW), trunk gateways (TGWs), application servers (AS), routing engines and policy servers, media servers (MS), and feature servers (FS), such as applications, routing engines, and policy servers.

Although the VoN service is attractive, customers typically are not willing to spend a lot of money on new equipment. Moreover, customers are not willing to accept typical data communications network (e.g., Internet) or power outages and unpredictability of these outages when it comes to VoN services.

And, problems exist for communications service providers. From an Internet Service Provider's (ISP) perspective (i.e., provider for data communications network services), ISPs would like to avoid professional installation thus minimizing their payback period and increasing their Return-On-Investment (ROI). From a local exchange carrier's perspective (i.e., telephone service provider), it is important to re-use as much of the existing communications network that they have in place today for VoN lines. This maximizes efficiency of the existing telecommunications network. And, this also minimizes training and capital expenses. For example, a maintenance procedure such as MLT (mechanized loop test) may be used to test and analyze a communications path with the customer's premise, and these types of procedures are already well known by repair personnel.

Accordingly, a need exists for methods and systems that enable a customer to enjoy the convenience and potential cost savings of a VoN system using their analog phone or other existing communications device (e.g., computer, VoIP phone, etc.) while ensuring a quality of service voice connection over the VoN. Furthermore, a need exists for methods and systems that minimize service providers' costs and leverage the assets of existing communications networks.

SUMMARY

According to exemplary embodiments, the needs described above and other needs are met by methods, systems, computer programs, and computer program products to deliver voice service over a next generation network that includes a telecommunications network and/or a data communications network. According to embodiments of this invention, methods and systems deliver voice service over an Internet Protocol network. According to other embodiments of this invention, methods and systems deliver voice service over a service node network. Advantages of this invention include (1) eliminating VoN customer premises equipment (CPE), (2) eliminating installation at the customer's premises, (3) reducing cost proposition to the end user, (4) using the local loop (instead of DSL) to connect customer premise POTS and/or analog telephones to VoN service, and thereby, minimizing outages, and (5) re-using MLT procedures for VoN lines, and, thereby reducing training costs of technicians.

According to an exemplary embodiment, a method for voice over network services may include detecting an off hook state of a directory communications address, decoding the voice over network setup communications signal to look up an internal communications address of the directory communications address and to collect and analyze a communications instruction, and/or establishing a voice over network feature server trigger to control communications with the directory communications address such that the trigger connects the communications signal from an advanced intelligent network telecommunications switch to a soft switch (SSW) complex communicating with a voice over network. The off hook state initiates a voice over network setup communications signal within the voice over network to the advanced intelligent network telecommunications switch to collect communications instructions, such as a called party's communications address (e.g., phone number), calling service features, such as three way calling, and other information. According to some of the embodiments, the internal communications address functions as a secret line number or shadow line number (SNL) that is matched and/or piggybacked with the directory communications address (e.g., the directory telecommunications number associated with the communications address). According to further exemplary embodiments, the method may include communicating the internal communications address and the called party's communications address via the voice over network feature server trigger to a feature server of the SSW complex, and then, the feature server matches the internal communications address with the directory communications address and uses the directory communications address and the called party's communications address to route a call over the voice over network to the called party's communications address.

According to yet further exemplary embodiments, the above method may continue and receive an instruction to add in another party to the voice over communications connection. The instruction includes a third party's communications address. Similar to above, the voice over network feature server trigger controls communications with the third party's communications address and connects the communications signal from the advanced intelligent network telecommunications switch to the SSW complex communicating with the voice over network. Thereafter, the internal communications address and the third party's communications address are communicated via the voice over network feature server trigger to the feature server, and the feature server matches the internal communications address with the directory communications address. The feature server then processes the directory communications address and the third party's communications address to add in another call to a communications connection of the directory communications address and the called party's communications address.

According to other exemplary embodiments, a voice over network system includes means for identifying a directory communications state of an analog communications device and for presenting a communications availability signal when the communications state is off-hook, an advanced intelligent network telecommunications switch connecting an analog communications device having a directory communications address and an internal communications address with a feature server of a SSW complex communicating with a voice over network, and means for decoding a voice over network setup communications signal to identify the internal communications address associated with the directory communications address and to collect and analyze a communications instruction, the internal communications address comprising a voice over network service of the communications address, and the communications instruction comprising a communications service feature and a called party's communications address. According to further exemplary embodiments, the system may include the voice over network communicating internet protocol telephony communications signals with the analog communications device via the advanced intelligent network telecommunications switch.

Yet other exemplary embodiments describe computer program products to perform the methods and enable the systems described above. For example, an embodiment describes a storage medium on which is encoded instructions for decoding a voice over network setup communications signal to look up an internal communications address associated with a directory communications address and to collect and analyze a communications instruction and establishing a voice over network feature server trigger to control communications with the directory communications address such that the trigger connects the communications signal from an advanced intelligent network telecommunications switch to a feature server of a SSW complex of a voice over network. The exemplary embodiments may further include encoded instructions for communicating the internal communications address and the called party's communications address via the voice over network feature server trigger to the feature server, and then, instructions for the feature server to match the internal communications address with the directory communications address and to process the directory communications address and the called party's communications address to route a call over the voice over network to the called party's communications address.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of the present invention.

DESCRIPTION OF THE DRAWINGS

The above and other embodiments, objects, uses, advantages, and novel features of this invention are more clearly understood by reference to the following description taken in connection with the accompanying figures, wherein.

DESCRIPTION

Figure 1:
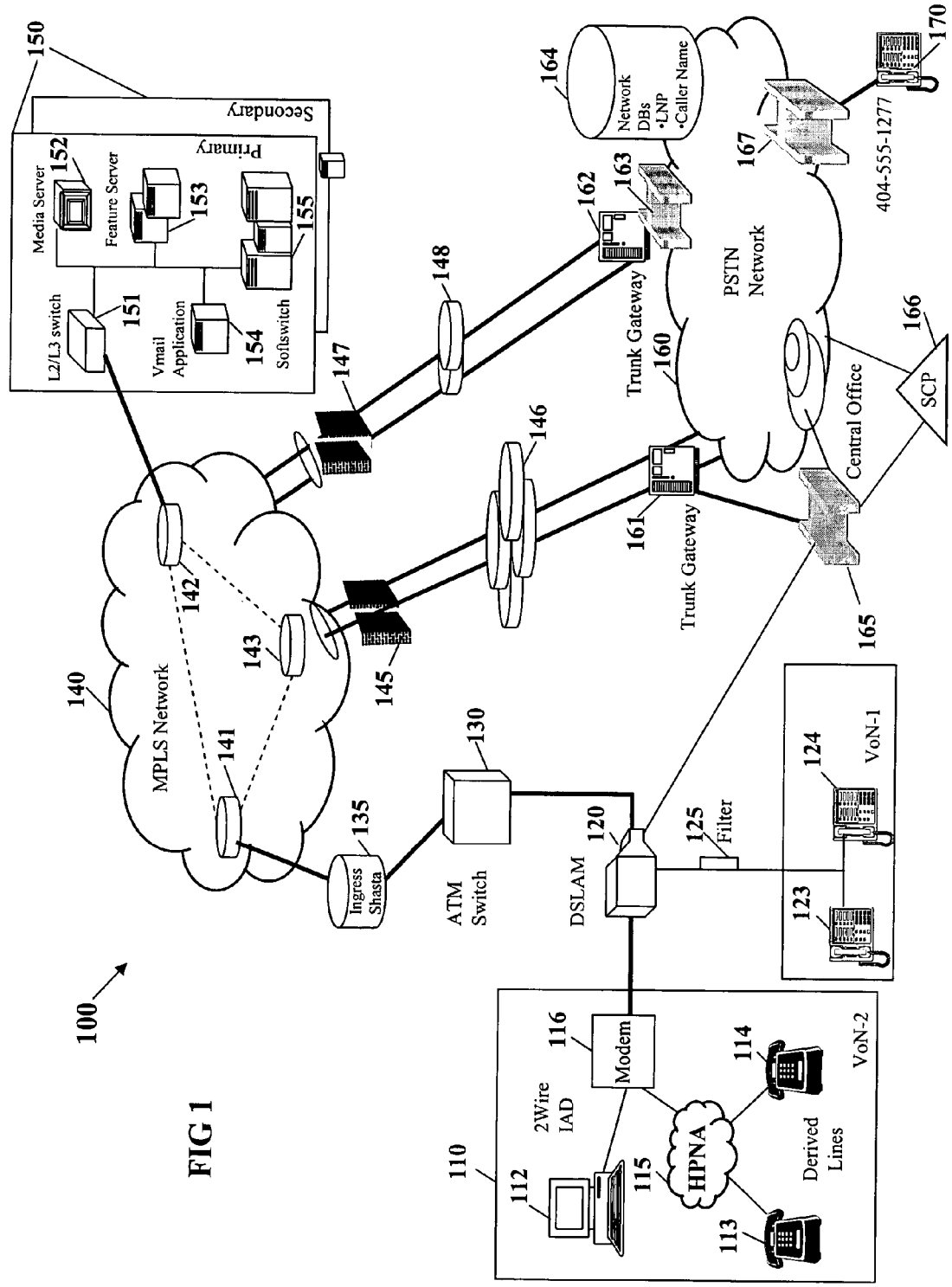
FIG. 1 an exemplary VoN/VoIP operating environment according to some of the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Exemplary embodiments of this invention provide systems, methods, and computer program products for delivering voice communication signals via a next generation network, such as a VoN/VoIP communications network, and is often referred to as "VoN" service for voice communications throughout this patent document. According to exemplary embodiments of this invention, several VoN architects provide means for receiving and sending voice communications from an analog phone (e.g., POTS phone) as well as from alternate voice communications devices (e.g., personal computer, VoIP phone, etc.). Some of the advantages of this invention include (1) eliminating VoN customer premises equipment (CPE), (2) eliminating installation at the customer's premises, (3) reducing costs to the end user, (4) using the local telecommunications loop (instead of DSL) to connect customer premise hardware and equipment to VoN service, and thereby, minimizing communications outages (e.g., power, availability, and so on), and (5) re-using existing line testing procedures for VoN lines, and, thereby reducing training costs of technicians.

Table 1 below presents high level architectural overviews for VoN service for voice communications according to some of the exemplary embodiments.

TABLE 1

Voice Over Network Feature Server Trigger Overview

| VoN Description | VoN Architecture and/or Process |
|---|---|
| CO WITH AIN TRIGGERS ALLOWING SSW COMPLEX TO CONTROL CALLS; VON SERVICE OPTION TO RIDE THE PSTN OR VON NETWORK FOR OUTGOING CALLS | 1. Originating calls trigger query to AIN SCP. SCP gets routing into from FS.<br>*Alternate embodiment: SCP always routes calls to SSW Complex & FS for processing without querying the FS.<br>**Alternate embodiment: SCP queries FS based on features assigned to the line. The SCP could base the query on various parameters, such as time of day routing, feature codes (e.g., |

TABLE 1-continued

Voice Over Network Feature Server Trigger Overview

| VoN Description | VoN Architecture and/or Process |
|---|---|
| | *69), least cost routing, etc.<br>2. Terminating calls routed from SSW complex to Class 5 switch<br>3. FS enhancements provide routing information to SCP<br>4. Use exisiting TGW & SSW routing (SSW routes to SLN # in CO) |

*Note: Mechanized Loop Testing (MLT) function sustained

Table 2 below presents an overview of Secret Line Number (SLN) call flows for the above identified VoN service for voice communications according to some of the exemplary embodiments.

TABLE 2

SLN Call Flows for Voice Over Network Feature Server Trigger

| SLN Originating Calls | Outgoing calls:<br>1. Class 5 has trigger assigned for SLN<br>2. Class 5 queries SCP passing CgPN = SLN<br>3. SCP sends SIP invite to FS with CgPN = SLN, CdPN = dialed digits<br>4. FS uses SLN to map to VoN # assigned to its end user<br>5. FS sends re-invite to SCP with CgPN = VoN#, CdPN = dialed digits |
|---|---|
| SLN Receiving Calls | Incoming calls:<br>1. SSW Complex receives SIP invite for incoming call to VoN # (ported POTS number) |

According to some exemplary embodiments, methods and systems of VoN for voice communications utilize a next generation softswitch, referred to as an SSW controlled line, to connect an analog phone on conventional home wiring (e.g., copper) to the VoN service for voice communications. Consequently, no telephone adapters (TA) need to be installed at customer's premises. Further, the VoN line is provided by the telecommunications service provider's central office and is controlled by the SSW, thus designing the SSW to operate as a network TA.

Referring now to the figures, FIG. 1 illustrates an exemplary VoN service for voice operating system 100. Operating system 100 may include customer premises hardware and equipment 110 including a home communications network, such as Home phoneline networking alliance ("HPNA"), connecting analog phones 113 and 114 and a modem 116 and a personal computer 112, a DSLAM 120, a filter 125 connected with other analog phones 123 and 124 (sometimes referred to as the "VoN-1" customer or subscriber), an ATM switch 130, a gateway 135 communicating with a data communications network (referred to as the "MPLS" network) 140 having additional gateways 141, 142, and 143 communicating with the softswitch complex (SSW) 150 having an L2/L3 switch 151 connected with a Media Server (MS) 152, a Feature Server (FS) 153, a voicemail application 154, and an Application Server (AS) (also referred to herein as the softswitch (SSW)) 155, firewalls 145 and 147, additional gateways 146 and 148, trunk gateway (TGW) 161, trunk gateway (TGW) 162 in tandem with central office (CO) 163, a telecommunications network (referred to as "PSTN network") 160 having database 164 and connecting another central office (CO) 165 and service control point (SCP) 166 with the DSLAM 120 and another central office (CO) 167 connecting with calling party telephone 170 (having a communications address of 404-555-1277).

Exemplary Embodiment: Voice Over Network Feature Server Trigger Overview

Figure 2:
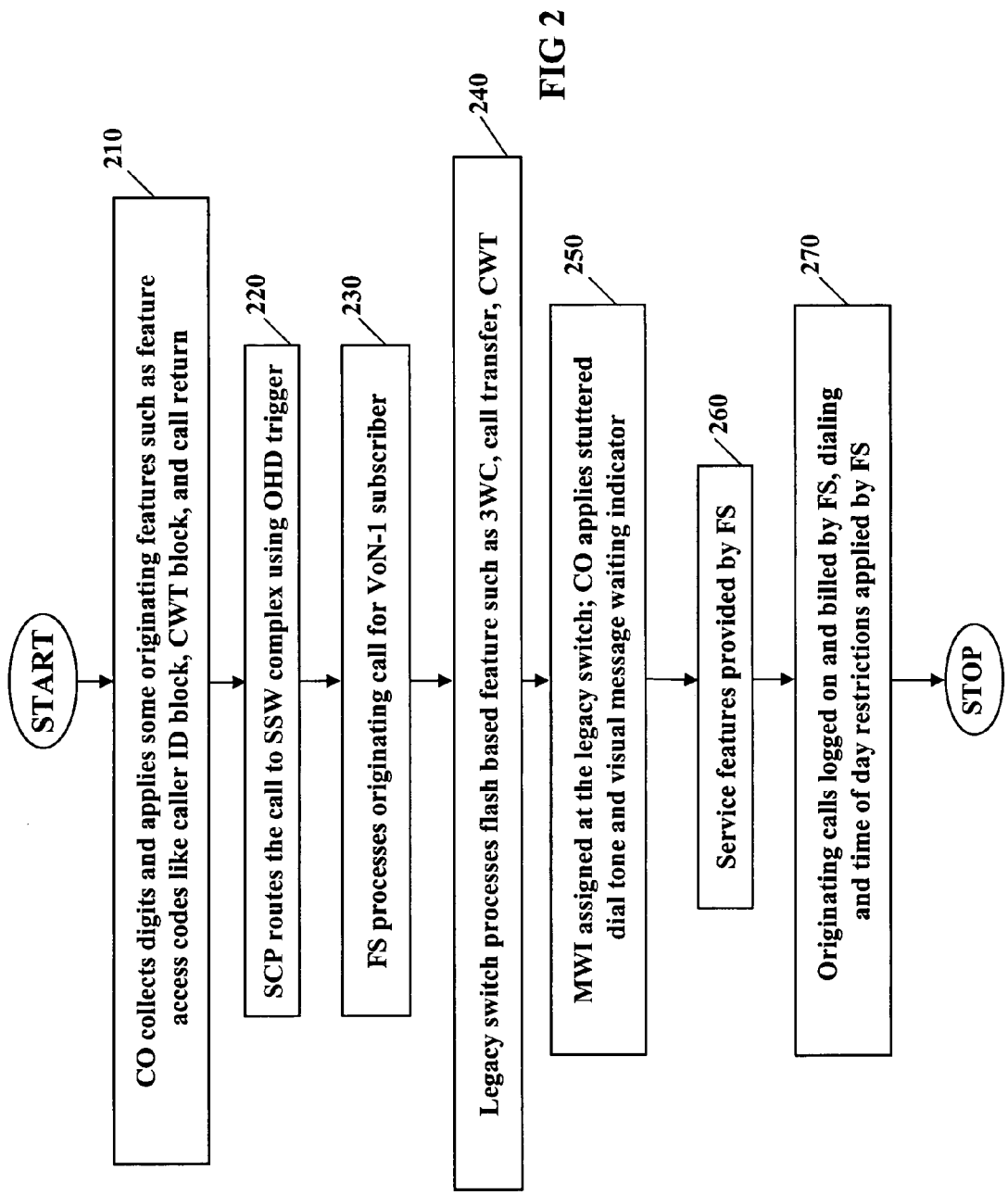
FIG. 2 illustrates a flow chart of an overview of a voice over network feature server trigger communications path according to some of the embodiments of this invention.

FIG. 2 illustrates an exemplary overview for a central office with advanced intelligent network triggers that allow a voice over internet application server to control communications. The central office (CO) 165 collects the communications instructions (e.g., the called party's communications address) and may process some of the originating features, such as call waiting and caller identification blocking [step 210]. Then, the SCP 166 routes a communication to a called party's communications number to the SSW complex 150 using an off-hook delay (OHD) trigger [step 220] and the FS 153 processes the originating communication from the VoN-1 subscriber from analog phone 123 and/or 124 [step 230]. The legacy switch 165 may process additional communications instructions, such as, for example, flash based feature including three way calling, call transfer, and/or call waiting [step 240]. Thereafter, a message waiting indicator (MWI) is assigned at the legacy switch 165 which applies a dial tone (or alternate communications availability status) and/or visual message waiting indicator [step 250]. Various service features may be provided by the VoN [step 260]. For example, three way calling and call forwarding features are provided by the FS 153. Furthermore, according to these exemplary embodiments, communications originating from the VoN-1 subscriber via analog phone 123 and/or 124 is logged and billed by the FS 153. And, the FS 153 may also provide dialing and time of day restrictions to outgoing and/or incoming communications with the analog phone 123 and/or 124 [step 270].

Figure 3:
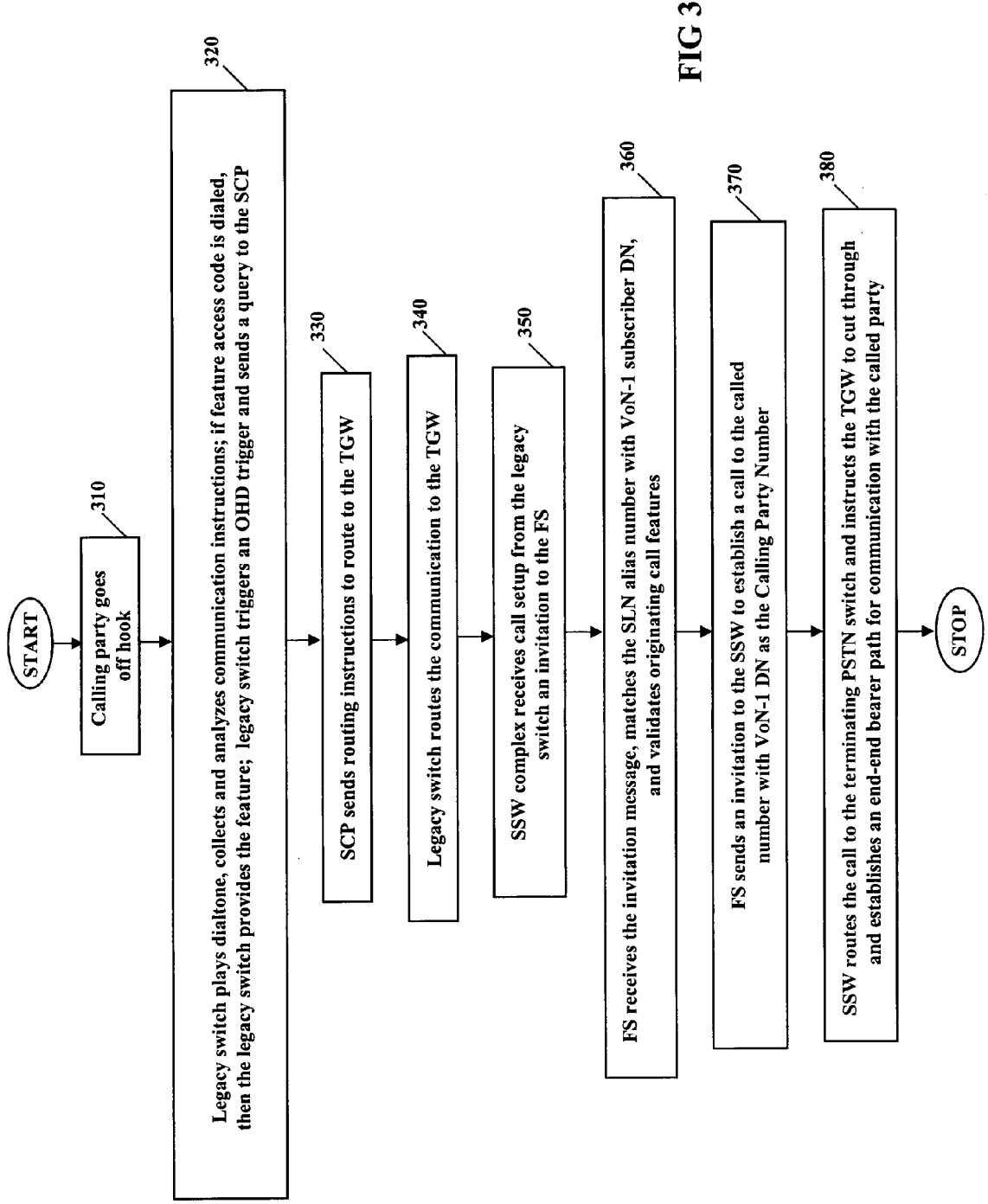
FIG. 3 illustrates a flow chart for an outgoing call via a voice over network feature server trigger to a called party's communications address according to some of the exemplary embodiments of this invention.
Figure 4:
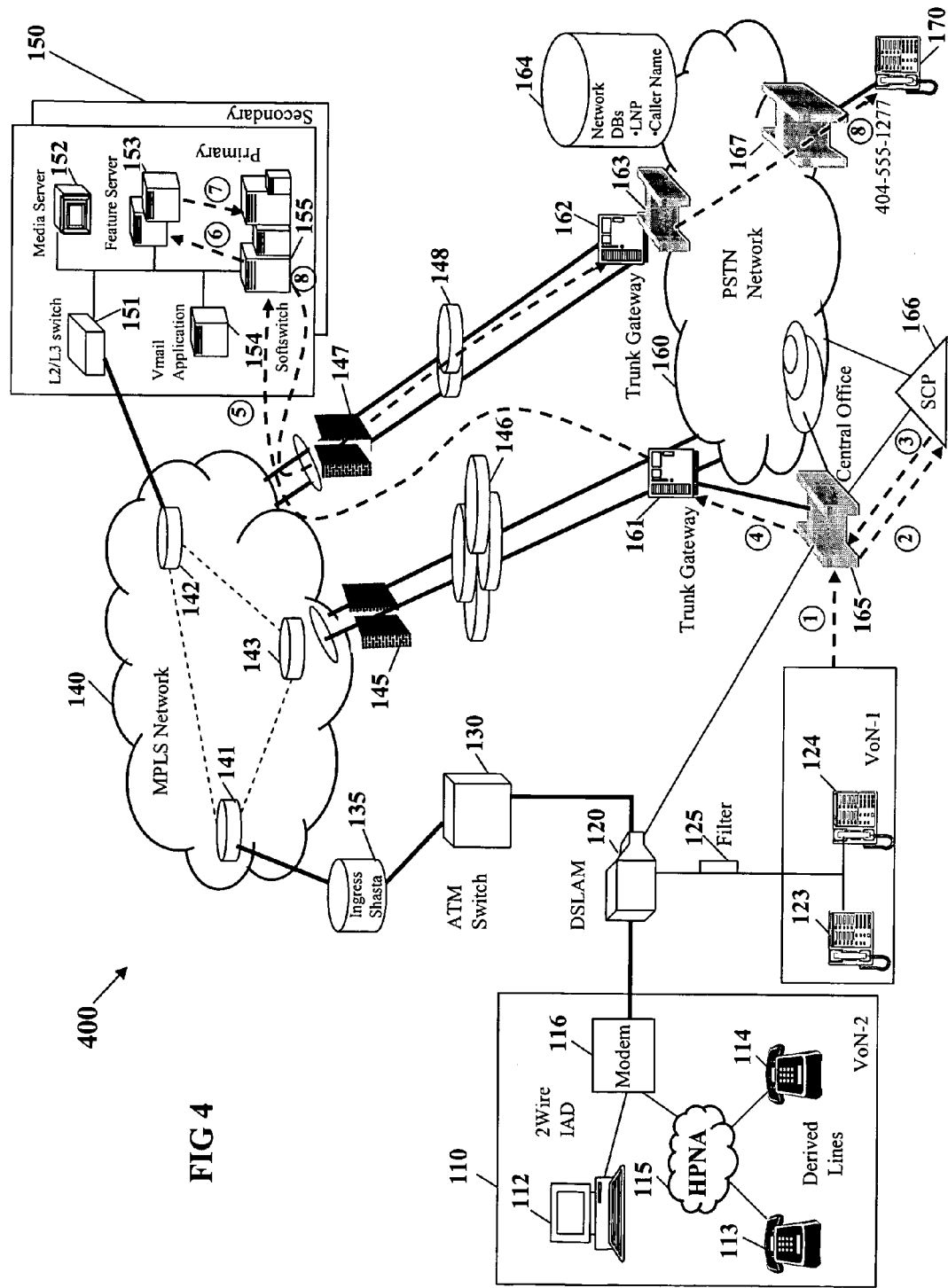
FIG. 4 illustrates an exemplary operating environment for an outgoing call via a voice over network feature server trigger to a called party's communications address according to some of the embodiments of this invention.

The following information is used for the purpose of describing an outgoing call for the exemplary embodiments described in FIGS. 3 and 4. The POTS Subscriber Number is 404-222-1111 before VoN service is enabled for analog phones 123 and/or 124. When the subscriber of phone 123 and/or 124 becomes a VoN-1 customer, the POTS Subscriber Number is ported and becomes the VoN number 404-222-1111 identified with SSW's Line Routing Number (LRN) and identified on the FS 153 and SSW complex 150. After porting the VoN number 404-222-1111 to VON service provider, such as a competitive local exchange carrier (CLEC), the VoN subscriber gets an additional communications address assigned on the legacy switch 165—the Secret Line Number or Shadow Line Number (SLN)—404-222-1234. This number is not known to the subscriber; rather the SLN is an internal communications address for identifying a VoN customer and for routing VoN communications. As used herein, the terms "subscriber," "customer," and/or "user" are used interchangeably. The legacy switch 165 routes the call to the SSW complex 150 using the SLN as the calling number. The caller name (CNAM) and message waiting indicator (MWI) are assigned at the legacy switch 165. All other features are provided by the FS 153. The SSW 155 is configured as a shared device type, such as a session initiation protocol (SIP) Non-Registering Gateway. The VoN-1 customer's communications device (e.g., telephone 123 and 124) is set to the softswitch device 155 with the line port set to the SLN. The communications address of the phone is set to the VON number.

A typical outgoing call is handled according to the flow chart of FIG. 3 and the routing shown in FIG. 4. In this exemplary embodiment, the analog phone 123 and/or 124 goes off hook [step 310] and the legacy switch 165 presents a dial tone to the analog phone 123 and/or 124 and collects and analyzes communications instructions (e.g., called party's communications address of 404-555-1277) [step 320]. If a feature access code is dialed from analog phone 123 and/or 124, then the legacy switch 165 provides the feature, such as caller identification blocking, call waiting, and call return. The legacy switch 165 triggers an OHD trigger to send a query to the SCP 166 for the collected digits of a called number or alternate communications instructions. Thereafter, the SCP 166 sends a routing instruction to the trunk gateway 161 [step 330] and the call is routed to the trunk gateway 161 [step 340]. Next, the SSW complex 150 receives the call setup from the legacy switch 165 and sends an invite to the FS 153 [step 350]. The FS 153 receives the invitation, matches the SLN alias number with the VoN-1 directory number of analog phone 123 and/or 124, and validates the originating call service features [step 360]. Then, the FS 153 sends an invitation to the AS 155 to establish a communications path to the called party's communications address 170 [step 370] and the AS 155 routes the call to the terminating telecommunications switch 163 and instructs another trunk gateway 162 to cut though and establish an end-end bearer communications path with the called party's communications address 170 [step 380].

Exemplary Embodiment: Three Way Calling

Figure 5:
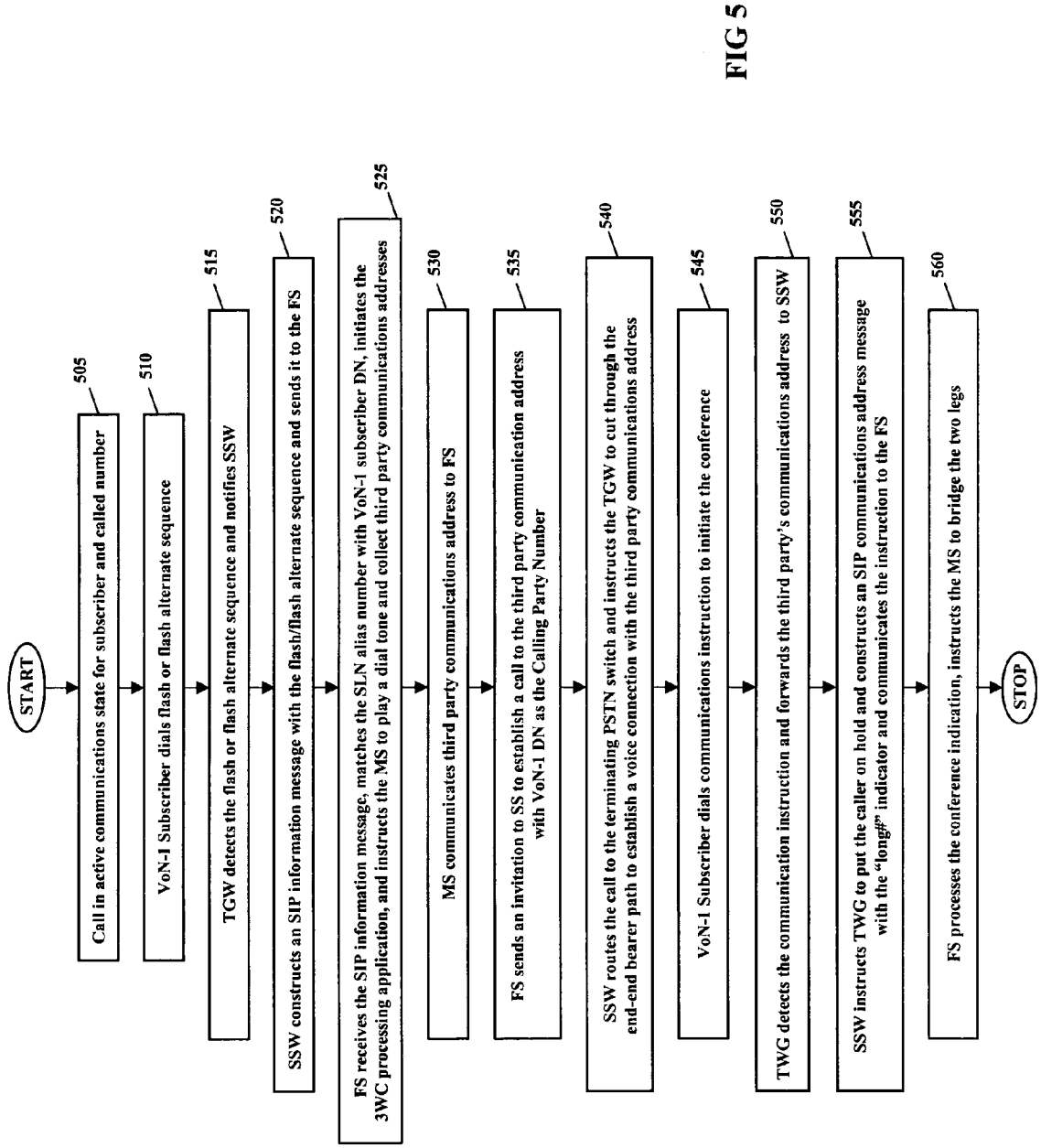
FIG. 5 illustrates a flow chart for adding in a third party to a communications connection established via the voice over network feature server trigger according to some of the exemplary embodiments of this invention.
Figure 6:
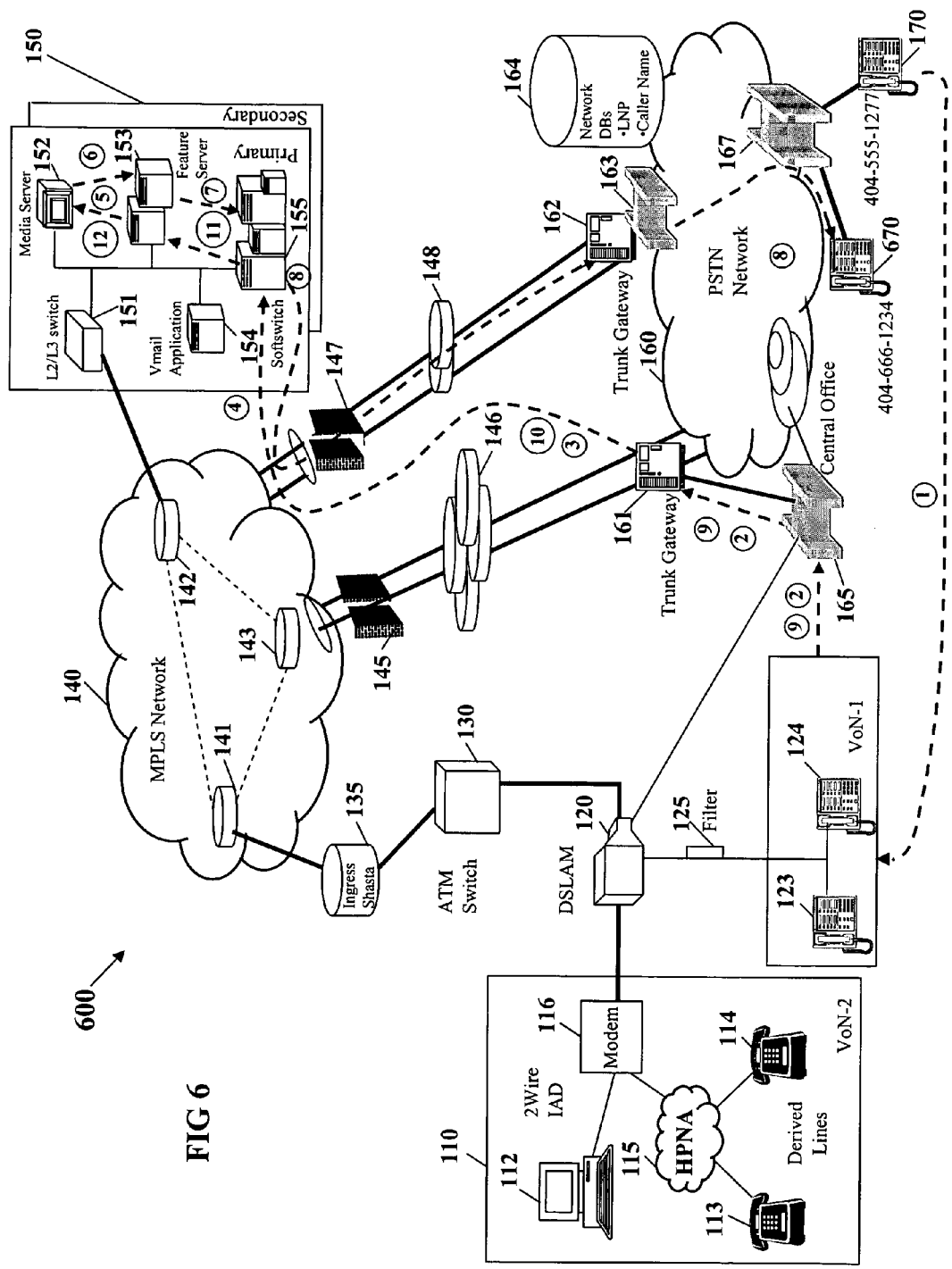
FIG. 6 illustrates an exemplary operating environment for adding in a third party's communications address via the voice over network feature server trigger according to some of the embodiments of this invention.

According to exemplary embodiments, a third party may be added to a VoN application server trigger communications connection according to the flow chart of FIG. 5 and the routing shown in FIG. 6. In this exemplary embodiment, the VoN-1 customer of analog phone 123 and/or 124 establishes a communications connection with the called party's communications address (e.g., 404-555-1277) via the VoN application server trigger [step 505]. During the communications connection, the VoN-1 subscriber dials a flash alternate sequence, such as, for example a "long #" indicator (or, alternatively '##' or another instruction to activate three way calling) [step 510]. The TGW 161 detects the "long #" (or alternate instruction) and notifies the SSW 155 [step 515]. The SSW constructs an SIP information message with the communications instruction (e.g., the "long #" indicator) and sends it to the FS 153 [step 520]. Next, the FS 153 receives the SIP information message, matches the SLN alias number (e.g., 404-222-1234 with VoN-1 subscriber directory number of 404-222-1111), initiates the three way call processing application, and instructs the MS 152 to play a dial tone and collect the third party's communications address (e.g., 404-666-1234) [step 525]. The MS 152 receives and communicates the third party's communications address with the FS 153 [step 530], and the FS 153 sends an invitation to the SSW 155 to establish a call among the third party communications address and the VoN-1 directory number of analog phone 123 and/or 124 as the Calling Party Number [step 535] (e.g., SIP:INVITE (URI=4046661234@hiQ.com, From: 4044221111@AS.com, To: 4045551277 @NS.com). Thereafter, the SSW 155 routes the call to the telecommunications switch 163 and instructs the TGW 162 to cut through the end-end bearer path to establish a voice connection with the third party communications address [step 540]. The VoN-1 Subscriber dials the communications instructions to initiate the conference [step 545]. And, while monitoring on the second leg, the TGW 161 detects the "long #" (or alternate communications instruction) and forwards the third party's communications address to the SSW 155 [step 550]. The SSW 150 then instructs the TWG 161 to place the called party of phone 170 (e.g., 404-555-1277) on hold, constructs an SIP invitation message with the "long #" indicator, and communicates the instructions to the FS 153 [step 555]. The FS 153 processes the "long #" and instructs the MS 152 to bridge the two communications paths to add in the third party to the existing voice communications connection of the VoN-1 subscriber and the called party [step 560].

Furthermore, the '##' indicator (or alternate flash or flash sequence) may similarly be processed to switch to a second call when a Call Waiting Tone is presented on an active call or for other communications "flash" based features, such as, for example call transfer.

While this invention has been described with respect to various features, aspects, and embodiments, those skilled and unskilled in the art will recognize this invention is not so limited. For example, the Application Server (AS) and the Service Control Point of the above described figures are shown as two stand alone components; however, AS and SCP may be a single, integrated AIN component that includes functionalities of an application server and of a service control point to provide access to and signaling with voice and data networks. Other variations, modifications, and alternative embodiments may be made without departing from the spirit and scope of this invention.

Abbreviations & Additional Descriptions

AIN—Advanced Intelligent Network
AS—Application Server or Softswitch
ATA—Analog Telephone Adapter
ATM—Asynchronous Transfer Mode
CDP—Cisco Discovery Protocol
CdPN—Called Party Number
CgPN—Calling Party Number
CLEC—Competitive Local Exchange Number
CNAM—Calling Name
CO—Central Office
CODEC—Coder/Decoder; converts a voice grade analog signal to a u-law or A-law encoded samples at an 8 KHz sampling rate; DSL bypasses the CODECs at the CO by separating the frequencies in a POTS splitter and passing the DSL signal to a DSLAM, the DSL equivalent of a CODEC
CPE—Customer Premises Equipment
DN—Directory Number
DSL—Digital Subscriber Line
DSLAM—Digital Subscriber Line Access Multiplexer; a mechanism at a phone company's central location that links many customer DSL connections to a single high-speed ATM line.
ETE—end to end
FS—Application Server of Softswitch (SSW) that provides features for VoN lines (FS in the SoftSwitch Complex)
HPNA—Home Phoneline Networking Alliance
IAD—Integrated Access Device
IAM—Initial Address Message
IP—Internet Protocol
IP Telephony—Internet Protocol Telephony
ISP—Internet Service Provider
LGW—Line Gateway; functions include providing dial-tone, collects digits, SIP, and RTP traffic.
LRN—Location or Line Routing Number
MLT—Mechanized Loop Testing
MPLS—MultiProtocol Label Switching
MS—Media Server
MWI—Message Waiting Indicator
NGN—Next Generation Network
OAM&P—Ordering, Administration, Maintenance and Provisioning
OHD—Off-hook Detection
PODP—Public Office Dialing Plan
POTS—Plain Old Telephone Service (this number gets ported to VoN (via AS))
PSTN—Public Switched Communications Network
RIB—Regional IP Backbone; provides core IP network for communication signals
ROI—Return on Investment
SCP—Service Control Point
SIP—Session Initiation Protocol
SLN—Secret Line Number or Shadow Line Number (i.e., the internal communications address) known by the CO and FS; non-published unique telephone number assigned by Class 5 switch to the VoN subscriber's local loop; known to the Class 5 switch; assigned to Class 5 switch after the original POTS number (i.e., the directory number) is ported; depending upon alternative chosen, it is used by the FS, SSW, SSW complex, SCP, etc.; SLN identifies the customer's local loop, the SLN is used for MLT testing.
SN—Service Node; SNs are used by industry for Intelligent Peripheral
SSW Complex—NGN Softswitch Complex (often includes AS and/or FS, media server, voicemail application and communications switches)
TA—Terminal Adaptor
TAT—Transatlantic Telecommunications Trigger
TCAP—Transaction Capabilities Application Part, adds transaction based functionality to PSTN
TG—Trunk Group ID
TGW—Trunk Gateway and/or Media Gateway
URI—Uniform Resource Identifiers
VoIP—Voice-over Internet Protocol
VoN—Voice-over Network Services
xATA—multi-line Analog Terminal Adapter

What is claimed is:

1. A method for voice over network services comprising:
receiving a voice over network communications signal from a directory communications address corresponding to a caller, the voice over network communications signal comprising a communications instruction from the directory communications address that corresponds to the caller;
decoding the voice over network communications signal to look up an internal communications address that corresponds to the caller of the directory communications address that corresponds to the caller and to process the communications instruction,
wherein the internal communications address that corresponds to the caller comprises a voice over network service of the directory communications address that corresponds to the caller and at least one feature access code that corresponds to a communications service feature; and
activating, in response to receiving the voice over network communications signal, a voice over network feature server trigger to control communications with the directory communications address that corresponds to the caller, the voice over network feature server trigger connecting the voice over network communications signal from an advanced intelligent network telecommunications switch to an application server communicating with a voice over network, the application server controlling the communications service feature of the directory communications address that corresponds to the caller, wherein the communications instruction comprises the communications service feature and a called party's communications address, and wherein the communications service feature comprises a call waiting service feature.

2. The method of claim 1, further comprising:

communicating the internal communications address that corresponds to the caller and the called party's communications address via a voice over network application server trigger to the application server wherein the application server matches the internal communications address that corresponds to the caller with the directory communications address that corresponds to the caller and wherein the application server uses the directory communications address that corresponds to the caller and the called party's communications address to route a call over the voice over network to the called party's communications address.

3. The method of claim 2, further comprising:

establishing a voice over network communications connection from the directory communications address that corresponds to the caller to the called party's communications address via the voice over network application server trigger to a telecommunications switch.

4. The method of claim 3, wherein establishing the voice over network communications signal from the directory communications address that corresponds to the caller to the called party's communications address via the voice over network application server trigger to the telecommunications switch further comprising instructing a voice over network gateway to connect the call via an end-end bearer path to the called party's communications address.

5. The method of claim 3, further comprising:

receiving an instruction to add in another party to the voice over communications connection, the instruction comprising a third party's communications address; and activating the voice over network application server trigger to control communications with the third party's communications address.

6. The method of claim 5, further comprising:

communicating the internal communications address that corresponds to the caller and the third party's communications address via the voice over network application server trigger to the application server wherein the application server matches the internal communications address with the directory communications address that corresponds to the caller and wherein the application server uses the directory communications address that corresponds to the caller and the third party's communications address to add in another call to a communications connection of the directory communications address that corresponds to the caller and the called party's communications address.

7. The method of claim 1, the incoming communications signal communicated via one of an internet protocol communication network, a telecommunications network, and an internet telephone communications network.

8. The method of claim 1, the communications service feature comprising a three way call service feature, a caller identification service feature, a hold service feature, a mute service feature, a voicemail service feature, a flash service feature, and a dual tone multi-frequency service feature.

9. A voice over network system comprising:

means for decoding a voice over network setup communications signal of an analog communications device to identify an internal communications address that corresponds to the caller associated with a directory communications address that corresponds to the caller and to collect and analyze a communications instruction, wherein the internal communications address that corresponds to the caller comprises a voice over network service of the directory communications address that corresponds to the caller and at least one feature access code that corresponds to a communications service feature; and means for activating a voice over network application server trigger to provide the communications service feature, the voice over network communicating internet protocol telephony communications signals with the analog communications device via an advanced intelligent network telecommunications switch, wherein the communications instruction comprises a communications device in communication with a telecommunications network, and wherein the communications service feature comprises a call waiting service feature.

10. The system of claim 9, further comprising:

means for identifying a communications state of the analog communications device and for presenting a communications availability signal when the communications state is off-hook.

11. The system of claim 9, the means for identifying a communication state of the analog communications device and for presenting a communications availability signal when the communications state is off-hook comprising a telecommunications switching device and a terminal, the telecommunications switching device and terminal further processing an outgoing telecommunications signal of the analog communications device via the voice over network.

12. The system of claim 11, wherein the telecommunications switching device communicates the called party's communications address to the voice over network application server.

13. The system of claim 11, wherein the telecommunications switching device further processes a communications instruction from the analog communications device.

14. The system of claim 9, the communications instruction comprising a communications service feature comprising a three way call service feature, a caller identification service feature, a hold service feature, a mute service feature, a voicemail service feature, a flash service feature, and a dual tone multi-frequency service feature.

15. A non-transitory storage medium on which is encoded instructions for performing the following:

receiving a voice over network communications signal from a directory communications address that corresponds to the caller, the voices over network communications signal comprising a communications instruction from the directory communications address that corresponds to the caller;

decoding the voice over network communications signal to look up an internal communications address that corresponds to the caller of the directory communications address that corresponds to the caller and to process the communications instruction, wherein the internal communications address that corresponds to the caller comprises a voice over network service of the directory communications address that corresponds to the caller and at least one feature access code that corresponds to a communications service feature; and activating, responsive to receiving a voice over network communications signal, a voice over network feature server trigger to control communications with the directory communications address that corresponds to the caller, the voice over network feature server trigger connecting the voice over network communications signal from an advanced intelligent network telecommunications switch to an application server communicating with a voice over network, the application server controlling the communications service feature of the directory communications address that corresponds to the caller, wherein the communications instruction comprises the communications service feature and a called party's communications address, and wherein the communications service feature comprises a call waiting service feature.

16. The storage medium of claim 15, further comprising instructions for performing the following:

communicating the internal communications address that corresponds to the caller and the called party's communications address via the voice over network application server trigger to the application server wherein the application server matches the internal communications address that corresponds to the caller with the directory communications address that corresponds to the caller and wherein the application server uses the directory communications address that corresponds to the caller and the called party's communications address to route a call over the voice over network to the called party's communications address.

17. The storage medium of claim 16, further comprising instructions for performing the following:

establishing a voice over network communications connection from the directory communications address that corresponds to the caller to the called party's communications address via the voice over network application server trigger to a telecommunications switch.

18. The storage medium of claim 17, further comprising instructions for performing the following:

receiving an instruction to add in another party to the voice over communications connection, the instruction comprising a third party's communications address; and activating the voice over network application server trigger to control communications with the third party's communications address.

19. The storage medium of claim 18, further comprising instructions for performing the following:

communicating the internal communications address that corresponds to the caller and the third party's communications address via the voice over network application server trigger to the application server wherein the application server matches the internal communications address that corresponds to the caller with the directory communications address that corresponds to the caller and wherein the application server uses the directory communications address that corresponds to the caller and the third party's communications address to add in another call to a communications connections of the directory communications address that corresponds to the caller and the called party's communications address.

* * * * *